United States Patent [19]
Emrich

[11] Patent Number: 4,660,295
[45] Date of Patent: Apr. 28, 1987

[54] METRIC MEASURING DEVICE FOR POSTAGE STAMPS

[76] Inventor: Albert Emrich, 309 Alder Rd., Dover, Del. 19901

[21] Appl. No.: 733,298

[22] Filed: May 13, 1985

[51] Int. Cl.⁴ .............................................. G01B 5/00
[52] U.S. Cl. ........................................ 33/541; 33/486
[58] Field of Search ................ 33/541, 571, 427, 428, 33/452, 464, 484–488, 490, 125 R, 1 BB; 206/39, 39.7; 353/120, DIG. 5; 235/70 B, 70 A

[56] References Cited

U.S. PATENT DOCUMENTS

| | | | |
|---|---|---|---|
| D. 163,030 | 4/1951 | Fiala | 33/541 |
| 781,222 | 1/1905 | Morse | 206/39 |
| 895,527 | 8/1908 | Williams | 206/39 |
| 1,215,441 | 2/1917 | Walker | 33/452 |
| 1,498,485 | 6/1924 | Schmidtke | 33/484 |
| 2,054,697 | 9/1936 | Fiala | 33/541 |
| 2,468,817 | 5/1949 | Duchin | 206/39 |
| 2,530,047 | 11/1950 | Dewar | 235/70 B |
| 2,537,473 | 1/1951 | McCusker | 33/484 |
| 3,522,655 | 8/1970 | Kilpatrick et al. | 33/464 |

FOREIGN PATENT DOCUMENTS

| | | | |
|---|---|---|---|
| Z5127IX | 10/1956 | Fed. Rep. of Germany | 33/464 |
| 493588 | 10/1938 | United Kingdom | 33/427 |
| 674961 | 7/1952 | United Kingdom | 33/464 |

Primary Examiner—Charles Frankfort
Assistant Examiner—Patrick R. Scanlon
Attorney, Agent, or Firm—Armstrong, Nikaido, Marmelstein & Kubovcik

[57] ABSTRACT

A hand-held measuring device including an elongated base having a pair of opposed parallel metric measuring scales on the upper face thereof, a slider slidably mounted on the base having a linear indicator perpendicular to the axis of the base and a holder device for holding the stamp on the base under the slider while the slider is being moved from one end of the printed border on the stamp to the other. The left hand edge of the printed border of the stamp must be zeroed at the zero points of both scales using the indicator line. The slider is then slid to the opposite printed border on the face of the stamp while the holding means is held firmly so that the indicator line registers therewith. The precise dimension of the distance across the face of the stamp to the right hand printed border can then be read off of both scales. The indicator inscribed on the slider is perpendicular to the axis of the base. The holding device can be a thin flexible folded over piece of celluloid type plastic.

11 Claims, 21 Drawing Figures

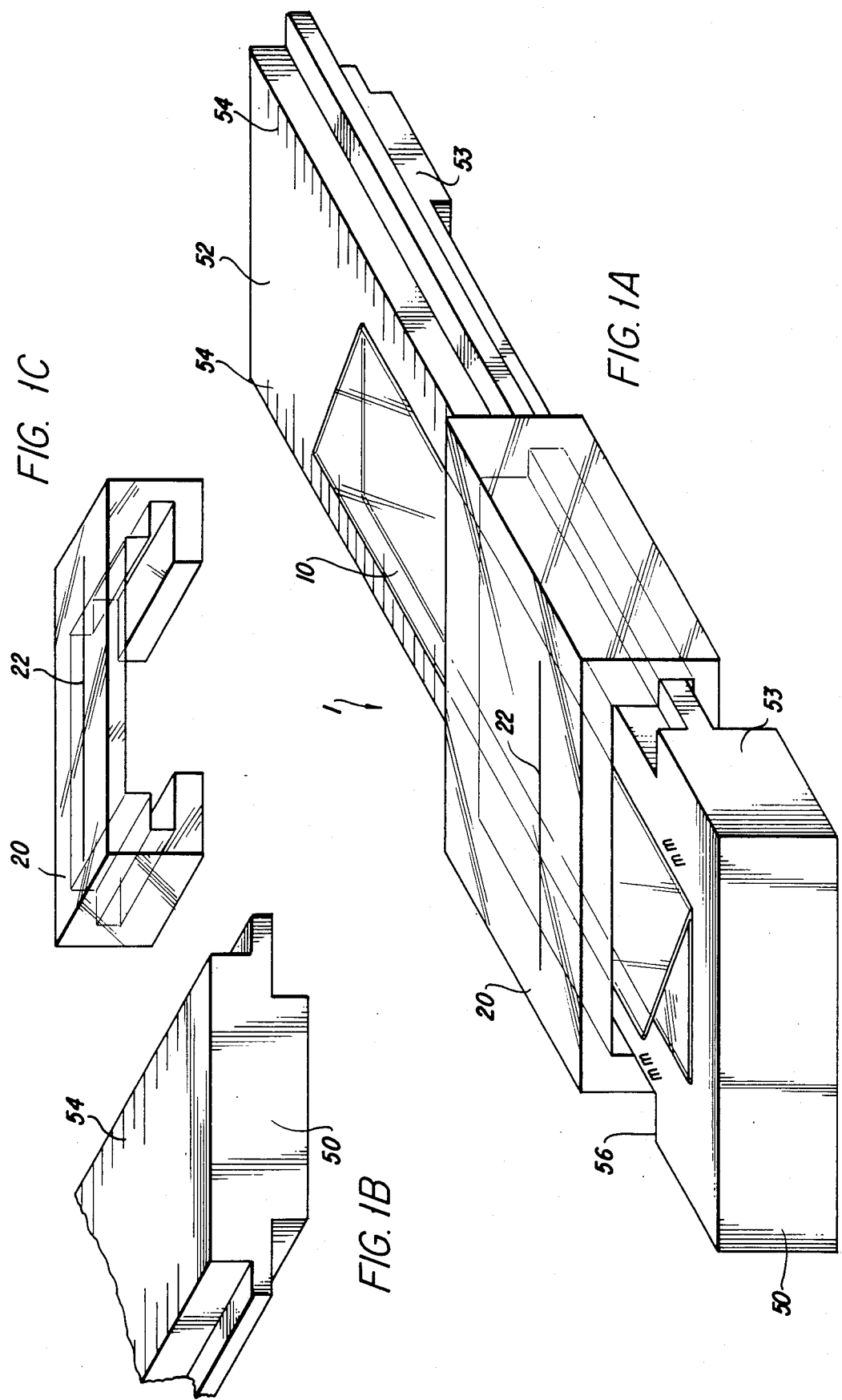

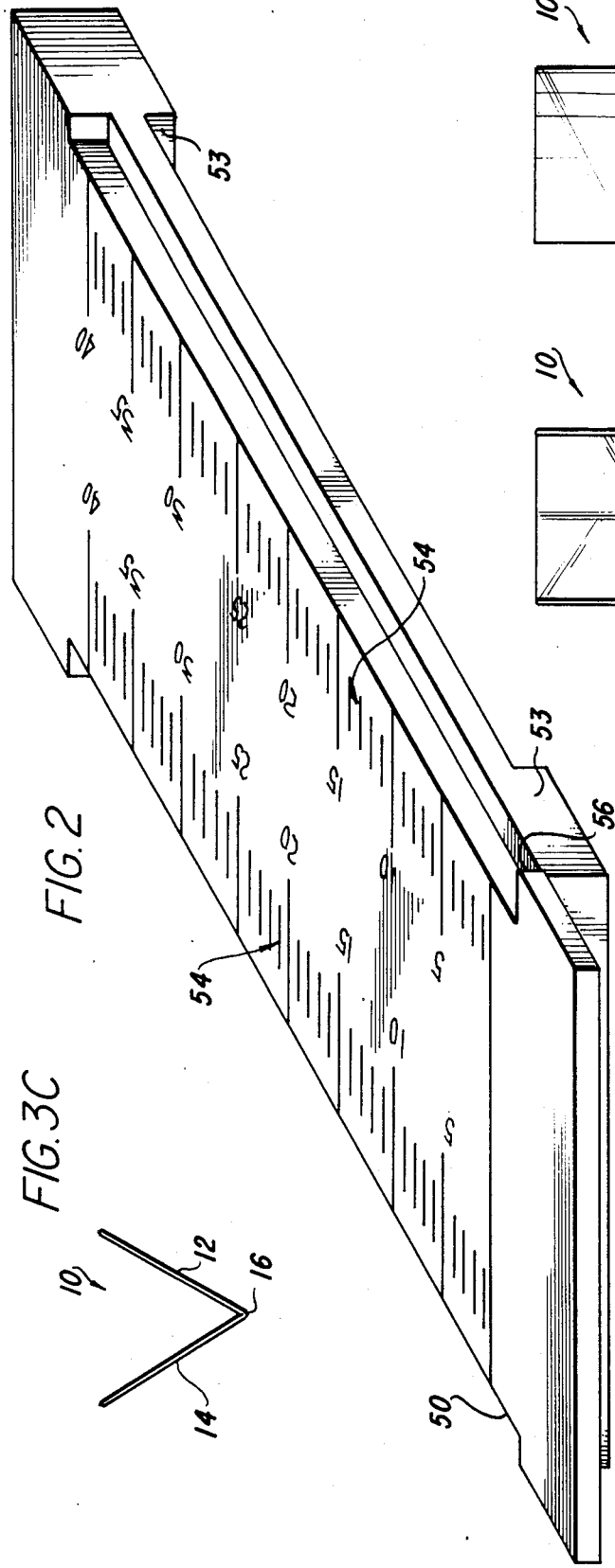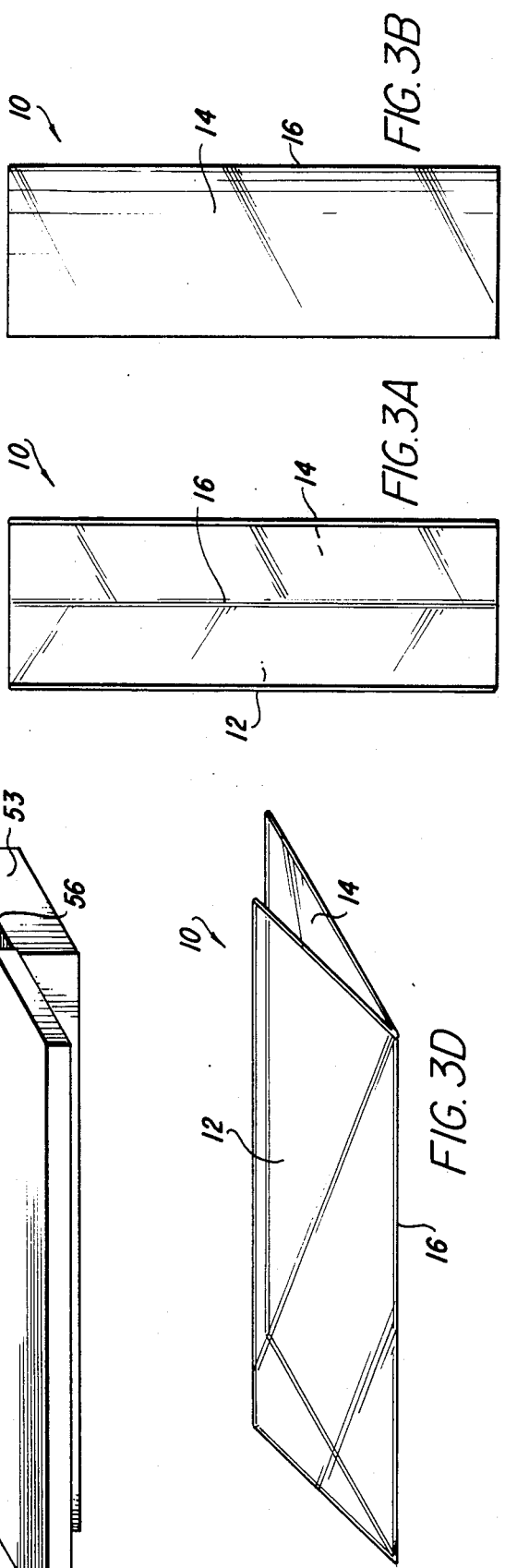

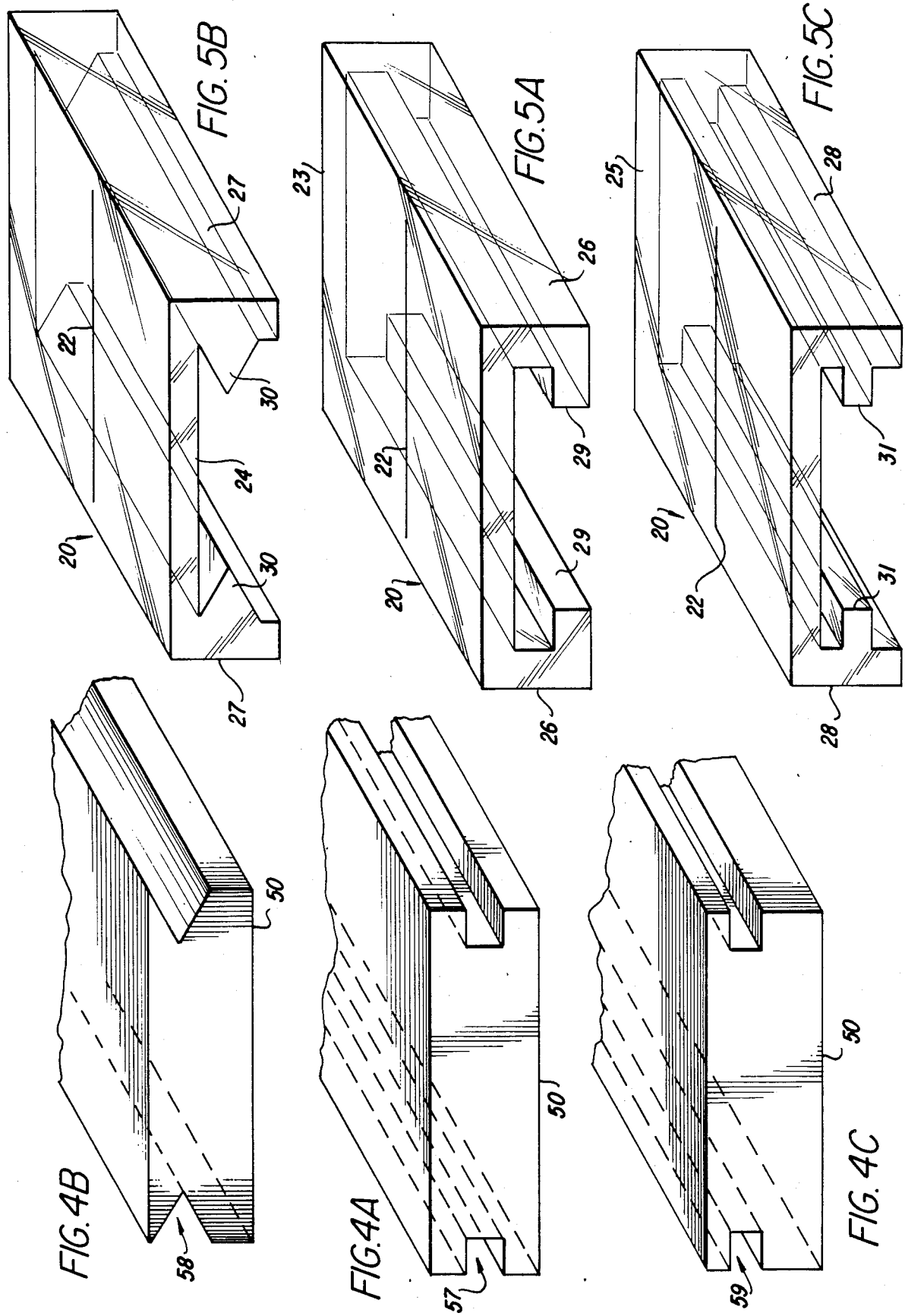

METRIC MEASURING DEVICE FOR POSTAGE STAMPS

BACKGROUND OF THE INVENTION

The present invention relates to a hand held device used to determine the absolute dimension of a postage stamp of any country of the world.

As is well known by postage stamp collectors, different types of printing were and are commonly used in printing postage stamps. These include rotary press printing and flat plate printing. When stamps are printed by a rotary press printing method, the printed borders on the face of the stamp are spread slightly. When printed by a flat plate printing, the printed borders on the face of the stamp have certain precise dimensions identical to those of the press plate used to print them. Two stamps can appear identical; however, if they were printed by the two above mentioned methods, their borders will not have the same dimensions. These dimensions can be measured to identify which type of printing produced the particular stamp. This separates and particularly identifies two otherwise identical stamps.

There is a certain difficulty in precisely measuring the dimensions of the borders of the stamp.

OBJECTS AND SUMMARY OF THE INVENTION

The present invention has as its object an apparatus and method for simply and easily measuring the dimensions of the printed borders on the face of a postage stamp.

A second object of the present invention is to provide an apparatus which can be simply and easily held in the hand and accurately, rapidly measure a postage stamp.

A third object of the present invention is to provide a simple method for repeatedly, accurately measuring the size of the printed borders on a postage stamp.

A fourth object of the present invention is to provide an apparatus for measuring a postage stamp easily and accurately which is simple to manufacture and simple to use.

These and other objects of the invention are accomplished in a hand-held device comprising an elongated base having a longitudinal axis, an upper face, and marked parallel scales on the upper face; a slider slidably mounted on the elongated base for movement along the axis of the base and having a linear indicator thereon perpendicular to the axis of the base and extending across both parallel scales; and means for holding a stamp on the base under the slider while the slider is being moved.

The method of the present invention comprises holding a stamp on an elongated base having marked parallel metric scales on the upper face thereof with the left hand edge of the printed border of the stamp being aligned with the zero points of both scales; sliding a marker over the stamp along the axis of the base with an indicator on the marker registering first the left hand edge of the printed border with the two zero points on the parallel scales, sliding the marker along the base to the opposite printed border of the stamp such that the indicator aligns with the opposite printed border and remains perpendicular to both parallel scales, and reading from the parallel scales the dimension of the printed borders on the stamp.

BRIEF DESCRIPTION OF THE DRAWINGS

The above objects and other attendant advantages of the present invention can be readily ascertained when reading the following description in conjunction with the accompanying drawings wherein:

FIG. 1A is a perspective view of a first principal embodiment of the present invention;

FIG. 1B is a partial perspective view of the elongated base; and

FIG. 1C is a perspective view of a slider usable with the base of FIG. 1B;

FIG. 2 is a perspective view of an elongated base of a second embodiment;

FIG. 3A is a top view of a holding means of the present invention;

FIG. 3B is a side view of the holding means;

FIG. 3C is an end view of the holding means; and

FIG. 3D is a perspective view of the holding means;

FIG. 4A is a partial perspective view of one form of grooves in the elongated base of the second embodiment:

FIG. 4B is a second form of grooves in an elongated base of the second embodiment;

FIG. 4C is a third form of grooves in the elongated base of the second embodiment.

FIG. 5A is a perspective view of a slider usable with the elongated base of FIG. 4A;

FIG. 5B is a perspective view of a slider suitable for use with the elongated base of FIG. 4B;

FIG. 5C is a perspective view of a slider suitable for use with the elongated base of FIG. 4C;

DETAILED DESCRIPTION OF PREFERRED EMBODIMENTS

Figure 6:
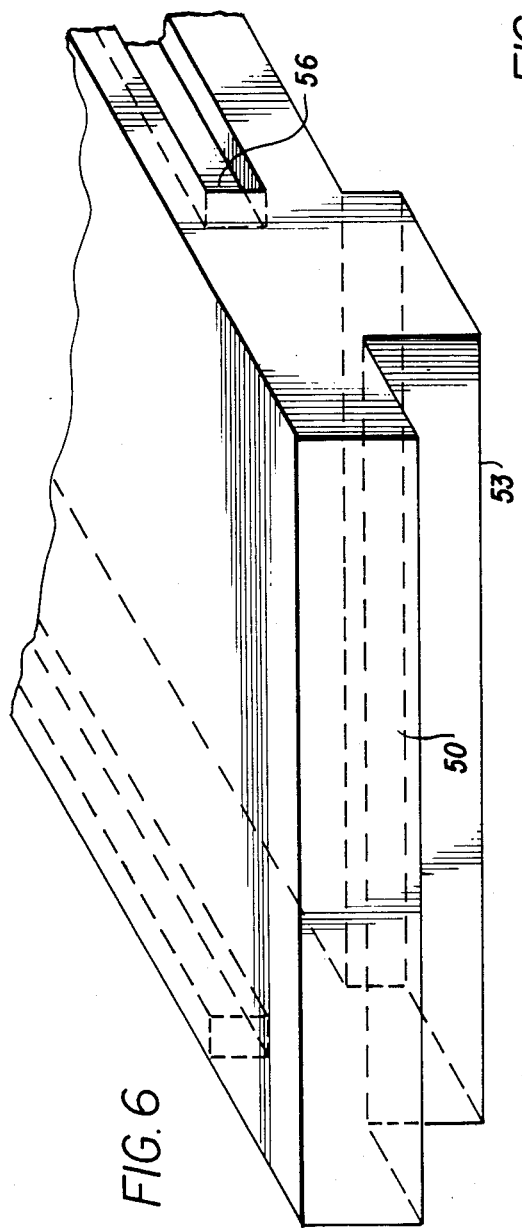
FIG. 6 is a partial perspective view of an elongated base having a suitable stop means.

As can be seen in FIG. 1, the metric measuring device 1 of the present invention basically comprises a means 10 for holding a postage stamp on a base 50 marked with two opposing metric scales 54. A slider 20 being totally transparent has a red indicator 22 thereon. This indicator is preferably in the form of a hair line mark on the slider. The slider is movably slidable along the elongated base. The scales 54 are marked on the upper face 52 of the base 50. Base 50 having depending legs 53 enables the invention to be placed on a flat surface to be operated conveniently without hindering the movement of the slider 20.

FIG. 2 shows the elongated base 50 having the scales 54 on the top thereof. Stop means 56 are provided on the base for stopping the slider at a position where the indicator means is precisely on both zero points of both parallel scales 54.

FIGS. 3A, 3B and 3C show the transparent holding means 10 for holding a stamp. It can be formed of a foldable piece of plastic 10 having an upper face 12 and a lower face 14 folded at 16. In use, the stamp is slid into the space between the faces 12 and 14 until one perforated edge of the stamp rests at the folded portion 16. Any plastic which is suitably stiff or rigid and is at least transparent would be suitable for the holding means 10.

As shown in FIGS. 4A, 4B, 4C, 5A, 5B, 5C, various different means for engaging the slider with the elongated base of FIG. 2 are suitable. In FIG. 4A, an elongated base having grooves 57 midway down the sides thereof can easily cooperate with a slider 20 as shown in FIG. 5A having an inverted U-shape with a center portion 23 and depending legs 26. Each depending leg 26 has an inwardly directed projection 29 which would engage with the mid-point grooves 57 of the base 50 shown in FIG. 4A. Alternatively, the slider 20 as shown in FIG. 5B can also be inverted U-shaped with a center portion 24 and depending legs 27. Each depending leg 27 has a triangular shaped projection 30 fitting in complementary grooves 58 on base 50 of FIG. 4B.

Still further, the elongated base 50 of FIG. 4C can have side grooves 59 positioned somewhat upwardly from the mid line of the sidewalls of the base and the slider 20 as shown in FIG. 5C can be of inverted U-shape having a center portion 25 with depending legs 28. Each depending leg 28 can have a rectangular projection 31 engaging in grooves 59 of the base 50 of FIG. 4C.

Figure 7A:
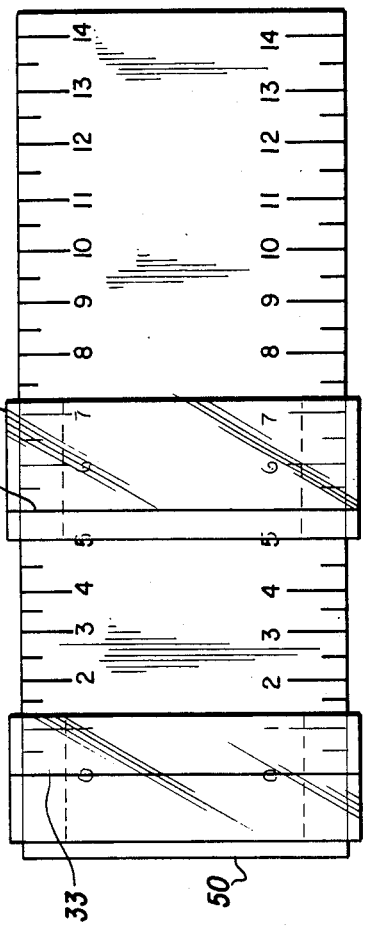
FIG. 7A is a top view of a third embodiment of the present invention having dual indicator means.
Figure 7B:
FIG. 7B is a side view thereof.
Figure 7C:
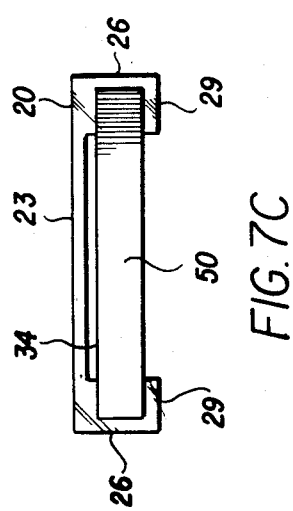
FIG. 7C is an end view thereof.

Further, as shown in the embodiment of FIG. 7A, 7B, and 7C, the slider can be formed as seen in FIG. 5A yet have the projections 29 wrap around the bottom of the base 50 of FIG. 7C. Any means of engaging the slider with the base such that the slider remains slidable along the base and keeps the indicator means generally perpendicular to the axis of the base would be suitable.

To simplify the positioning of the stamp such that the left printing border of the stamp is at the two zero points of the parallel scales, stop means 56 as shown in FIG. 1 is provided or could be modified as shown in FIG. 6. In the structure such as those shown in FIGS. 4A, 4B, and 4C, the groove 57, 58, or 59 can be made to end as shown in FIG. 6 at one desired point along the side of the base with the end of the groove being the stop means 56. Alternatively, as shown in FIGS. 1 and 2, the side walls of the elongated base have been extended to provide the stop means 56.

Another embodiment is disclosed in FIG. 7A, 7B, and 7C wherein a second fixed indicator means 33 is formed similar to that of the slider 20, but is fixed to the elongated base 50. As shown in the end view of FIG. 7C, in this embodiment as well in all of the other embodiments of the present invention, a clearance 34 is provided between the center portion 23 of the slider and the base 50. This is to permit positioning of the holding means 10 or of a standard glassine envelope commonly used by stamp collectors for holding individual or groups of related stamps.

Figure 8:
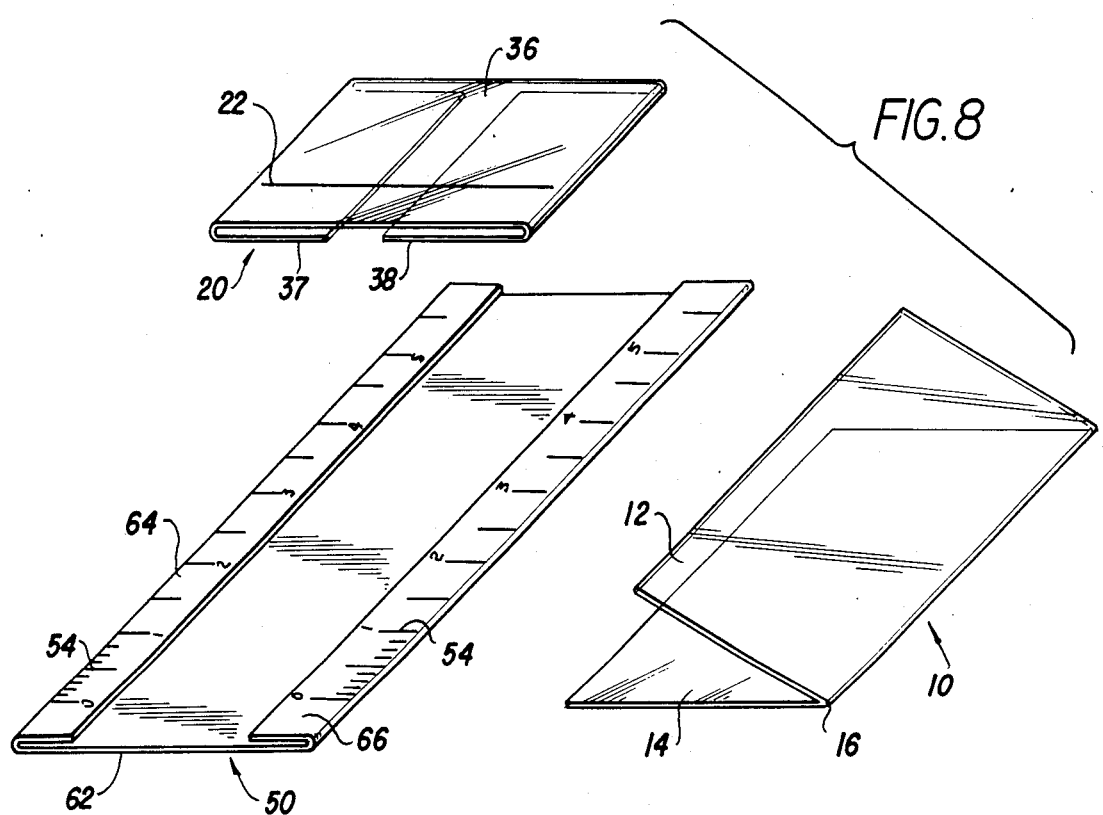
FIG. 8 is a perspective, exploded view of a fourth embodiment of the present invention.

FIG. 8 shows yet another embodiment of the present invention in which the elongated base 50 is made from sheet plastic having a main portion 62 with two folded over side portions 64, 66 bearing the scales 54. The holder or holding means 10 of this embodiment is the same as the others having a top face 12, a bottom face 14, and a folded edge portion 16. The slider 20 of this embodiment is a wrap around piece of clear plastic having a straight portion 36 with indicator means 22, and two folded around back portions 37, 38 which extend around the main portions 62 of the elongated base 50.

Figure 9:
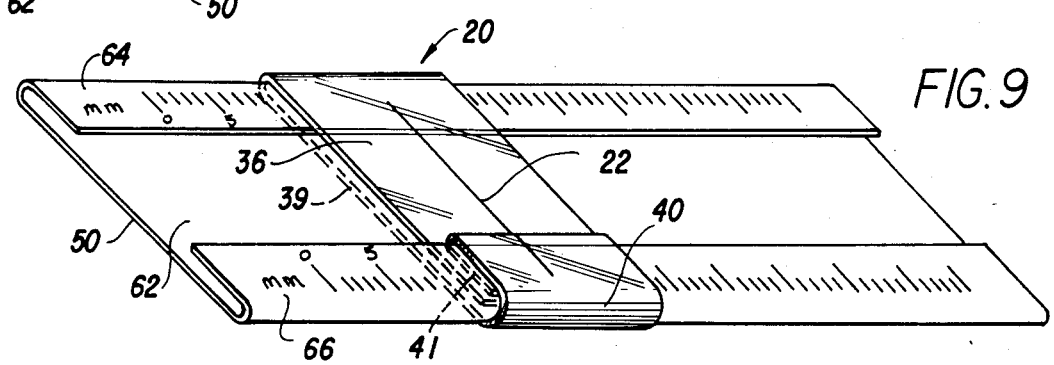
FIG. 9 is a perspective view of a fifth embodiment of the present invention.

Another embodiment as shown in FIG. 9 wherein the elongated base 50 is the same as that of the embodiment of FIG. 8 having a main portion 62 with two folded over side portions 64 and 66 bearing the scales. The slider 20 of this embodiment is also a wrap around piece of clear plastic having a straight portion 36 with the indicator means 22 thereon. The slider further includes a back portion 39 wrapped around the main portion 62 of the elongated base 50, an upper side portion 40 extending up over the top of one of the folded over side portion 66, and a lower side portion 41 tucked into and under the side portion 66 of the elongated base 50. It is to be noted that the straight portion 36 with the indicator is also slid under the folded over side portion 66 under the lower side portion 41.

Figure 10:
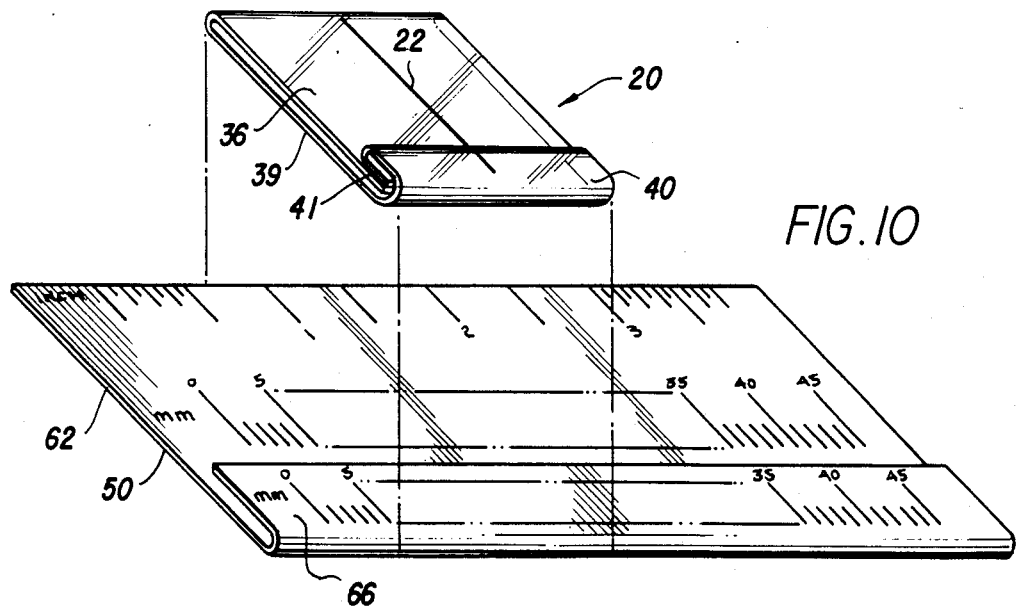
FIG. 10 is an exploded, perspective view of a sixth embodiment of the present invention.

FIG. 10 shows yet a further embodiment having a slider 20 identical to that of FIG. 9 and having an elongated base 50 with only one folded over side portion 66. The main portion 62 together with the folded over side portion 66 bear the metric measuring scales. The main portion 62 also contains an added standard inch scale for added convenience.

The two opposing measuring scales are preferably metric graduated in one-half millimeter increments in this embodiment as all other embodiments for accurate readings.

In use, the device as seen in FIG. 1 is operated by placing a stamp in the holder means 10 either in a horizontal or vertical orientation, allowing for measurement of the distance between the printed borders on the face of the stamp. The slider is then moved over to the stop means 56 at the zero point end of the scale automatically aligning the red vertical hairline with the zero points of both parallel opposed metric scales. The holder means is then slid under the slider at the zero point end of the scale 54 aligning the left printed border of the stamp with the red vertical hair line already pre-positioned over the zero points of both parallel opposed metric scales. The holding means is then fixed in position by the thumb of the operator and must be continually held firmly so as not to move while the slider is repositioned along the elongated base until the indicator means 22 registers with the opposite side edge of the printed border of the stamp. The reading off of the opposed parallel scales is then taken. The slider is designed to maintain perfect alignment with the horizontal axis of the elongated base at all times.

The depending legs 53 of the embodiments of FIGS. 1, 2, and 6 are not critical to the operation of the invention, but do enable easier use thereof. That is, the depending legs 53 elevate the base above a table surface so that it is easier to pick up and so that no difficulty is encountered with the slider while operating the invention even when it is on a table.

The present invention can be of any size desired. However, one example would be having the elongated base be approximately eight inches in length and three inches wide with opposing metric scales calibrated to one-half millimeters printed along the upper face thereof. The slider can be transparent and approximately one and one half inches long and three and one sixteenth inches wide having a red, vertical hair line approximately one-half inch from the right side. The holder means for the stamps can be a thin, flexible, celluloid material approximately three inches long and two inches wide.

It is readily apparent that the above-described metric measuring device for postage stamps meets all of the objectives mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What I claim is:

1. A metric measuring device for postage stamps, each having printed borders on a face thereof, comprising:

an elongated base having a longitudinal axis, an upper face, and marked parallel metric scales on said upper face having zero points at one end thereof;

a slider slidably mounted on said elongated base for movement along said axis and having a linear indicator means thereon perpendicular to said axis; and an independent, transparent means for holding a stamp positionable on said base under said slider while said slider is being moved;

whereby a stamp can be placed in said means for holding, said slider can be moved along said base until said linear indicator means registers with said zero points, whereupon said means for holding can be positioned on said base such that a left hand edge of the printed border is aligned with said zero points on both said scales and said indicator means, whereafter said slider can be repositioned along said base while said means for holding remains stationary until said indicator means registers with an opposite side edge of the printed border on a right hand side of said stamp and the dimensions can be read on both said scales.

2. The measuring device as claimed in claim 1 wherein said scales are metric marked on one-half millimeter intervals.

3. A measuring device as claimed in claim 1 wherein said slider is dimensioned such that a clearance is present between a lower side thereof and said upper face for said means for holding.

4. A measuring device as claimed in claim 1 wherein said slider is a cursor having a transparent portion and said indicator means is a marked red line across said transparent portion.

5. The measuring device as claimed in claim 1 wherein said means for holding is a folded over piece of transparent plastic having an upper face, a lower face, and a fold portion joining said upper face of said piece and said lower face.

6. The measuring device as claimed in claim 1 wherein said slider has an inverted U shape having a center portion and depending legs, each leg having an inwardly directed projection and wherein said base has a pair of parallel grooves in the sides thereof, said projections of said slider riding in said grooves.

7. The measuring device in accordance with claim 6 wherein said elongated base has stop means for automatically stopping said slider at a position where said indicator means is precisely on zero points of each of said scales.

8. The measuring device as claimed in claim 1 further comprising a mounted zero indicator positioned at said zero points of scales on said base with a clearance between said zero indicator and said base for said means for holding.

9. The measuring device as claimed in claim 1 wherein said elongated base comprises a main portion and two folded over side portions bearing said scales and wherein said slider is a wrap around piece of clear plastic having a straight portion with said indicator means and folded around back portions extending around the back of said main portion of said elongated base.

10. The measuring device as claimed in claim 1 wherein said elongated base comprises a main portion and at least one folded over side portion bearing said scales; and wherein said slider is a wrap around piece of clear plastic having a straight portion with said indicator means, a back portion extending around said main portion of said elongated base, an upper side portion extending over one of said side portions bearing said scales, and a lower side portion connected to said upper side portion tucked into one of the folded over side portions.

11. A method of measuring the printed borders on the face of a postage stamp comprising:

placing a stamp in a means for holding the stamp which is transparent;

moving a slider having indicator means thereon along an elongated base bearing opposed parallel metric scales on an upper face thereof, said indicator means registering with zero points of both said scales;

positioning the means for holding on said elongated base, such that a left hand edge of the printed border is aligned with zero points on both said scales and said indicator means;

repositioning said slider along said elongated base while said means for holding remains stationary until said indicator means registers with an opposite side edge of the printed border on a right hand side of the said stamp; and reading the dimensions on both said scales.

* * * * *